United States Patent [19]

Arato

[11] Patent Number: 5,202,997
[45] Date of Patent: Apr. 13, 1993

[54] DEVICE FOR CONTROLLING ACCESS TO COMPUTER PERIPHERALS

[75] Inventor: G. Peter Arato, Etobicoke, Canada

[73] Assignee: Isolation Systems Limited, Etobicoke, Canada

[21] Appl. No.: 578,561

[22] Filed: Sep. 6, 1990

Related U.S. Application Data

[63] Continuation of Ser. No. 915,226, Oct. 3, 1986, abandoned.

[30] Foreign Application Priority Data

Mar. 10, 1985 [GB] United Kingdom ............... 8524455

[51] Int. Cl.⁵ ..................... G06F 13/12; G06F 11/30
[52] U.S. Cl. .................................... 395/725; 395/425; 364/DIG. 2; 364/918.7; 364/969.1; 364/969; 364/949.4
[58] Field of Search ............... 395/725, 425; 364/200 MS File, 900 MS File

[56] References Cited

U.S. PATENT DOCUMENTS

| 3,368,207 | 2/1968 | Beausoleil et al. | 364/200 |
|---|---|---|---|
| 3,398,405 | 8/1968 | Carlson et al. | 364/200 |
| 3,473,159 | 10/1969 | Cantrell et al. | 364/200 |
| 3,508,205 | 4/1970 | Kubie | 364/200 |
| 3,585,606 | 6/1971 | Evans | 364/200 |
| 3,725,872 | 4/1973 | Balogh, Jr. et al. | 364/200 |
| 3,872,444 | 3/1975 | Cleveland et al. | 364/200 |
| 4,000,487 | 12/1976 | Patterson et al. | 364/200 |
| 4,264,782 | 4/1981 | Konheim | 178/22 |
| 4,601,011 | 7/1986 | Grynberg | 364/900 |

FOREIGN PATENT DOCUMENTS

| 0175359 | 3/1986 | European Pat. Off. |
| 1142465 | 2/1969 | United Kingdom . |
| 2019060 | 10/1979 | United Kingdom . |
| 2061578 | 5/1981 | United Kingdom . |
| 2087606 | 5/1982 | United Kingdom . |
| 2136175 | 9/1984 | United Kingdom . |
| 8603864 | 7/1986 | World Int. Prop. O. . |

Primary Examiner—Kevin A. Kriess
Attorney, Agent, or Firm—Bell, Seltzer, Park & Gibson

[57] ABSTRACT

An access control module restricts access to a computer system to authorized users and selectively controls each user's access to associated computer peripherals such as data storage units, printers, and communications equipment. During start-up of the computer system, a microprocessor associated with the module invokes a software routine that requests entry of a valid user identification code. In response to the code, the microprocessor retrieves from a main non-volatile storage unit prerecorded information regarding the user's authority to access each of the peripherals, and loads the information into a secondary storage unit comprising random access memory and an address decoder adapted to retrieve data therefrom. Thereafter, the address decoder responds to each peripheral address signal generated in the input/output channel associated with the computer system and retrieves from the secondary storage unit the access information relating to the peripheral identified by the address signal. A latching circuit generates and maintains a signal indicating a violation of computer security if the retrieved information indicates that the current user of the computer system is not authorized to access the selected peripheral. The microprocessor responds to the signal indicating security violation by applying signals to the input/output channel which interrupt the operation of the computer system and interfere with access to the selected peripheral.

9 Claims, 3 Drawing Sheets

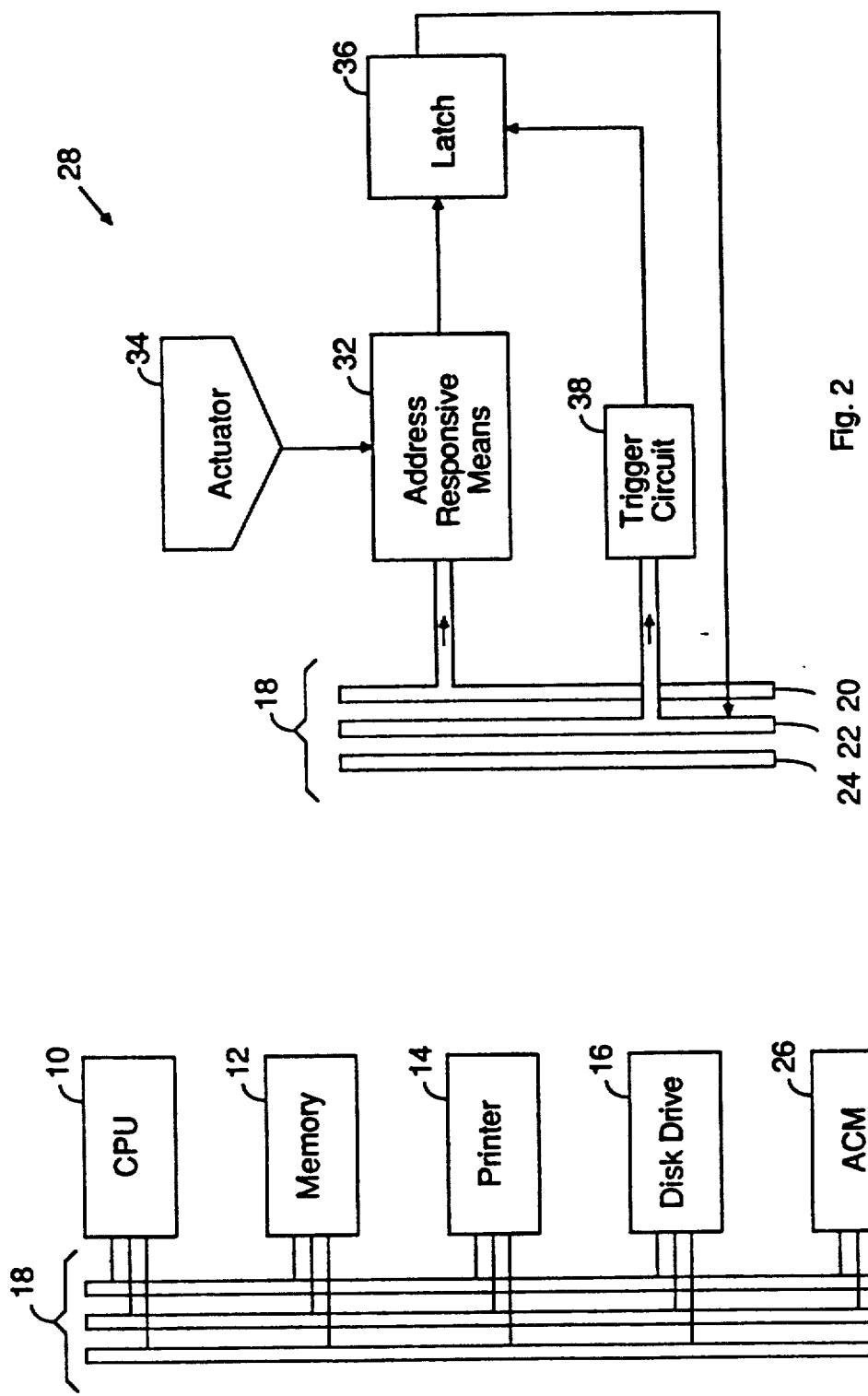

DEVICE FOR CONTROLLING ACCESS TO COMPUTER PERIPHERALS

This application is a continuation of application Ser. No. 06/915,226, filed on Oct. 3, 1986 now abandoned.

FIELD OF THE INVENTION

The invention relates generally to devices and methods for controlling access to the resources of a computer system and, more particularly, for controlling access to computer peripherals such as data storage units, printers and communications equipment.

DESCRIPTION OF THE PRIOR ART

There are several aspects to the problem of ensuring the security of data stored in a computer system. First, it may be desirable to ensure that only authorized individuals have access to any of the resources associated with the computer system. Second, it may be desirable to restrict an authorized user's ability to retrieve and review data stored in particular peripherals associated with the computer system. Lastly, although a user may be authorized to review certain data in temporary form on a display screen, it may be desirable to restrict the user's ability to produce printed copies of the data or to transfer the data from the computer system by other means such as peripherals constituting or accessing communication channels.

Security control systems which meet the requirements above have been implemented in software form either as part of a computer's operating system or as specific application software. However, software routines can very often be circumvented. The design of trusted software whose operation cannot be readily defeated is difficult, and an entire field of computer science has developed relating to the implementation of secure operating systems and the analysis of how such systems can be verified and validated.

It would accordingly be desirable to provide access control means for a computer system which can be implemented essentially in hardware form. Because the operation of hardware devices is more difficult to circumvent than that of software routines, and since attempts to modify or remove hardware can be more readily detected, hardware-type devices would potentially provide better security. Additionally, hardware-type security devices would lend themselves more readily to verification and validation thereby further ensuring that there are no inherent means of circumvention.

It would also be desirable to provide access control means which can be conveniently adapted for use with microprocessors such as personal computers. Such computers are now widely used and have a potential to access confidential information surreptitiously from main frame computers or mass storage devices in a local area network. A satisfactory means for regulating use of such computers is accordingly required.

BRIEF SUMMARY OF THE INVENTION

In one aspect, the invention provides an access control device for use with a computer system in which an address signal uniquely identifying a particular peripheral is conducted along an input/output channel (I/O channel) whenever a user selects a particular peripheral. The device includes access information generating means which can be actuated to provide access information regarding each peripheral, information indicating whether use of a peripheral is authorized or restricted. Access-responsive means detect an address signal in the I/O channel and cause the access information generating means to generate access information for the associated peripheral. The access information generating means are preferably in the form of storage means which store access information, and the address-responsive means are preferably adapted to retrieve the required access information from appropriate storage locations. Interruption means responsive to the access information apply a signal to the I/O channel which interferes with use of the peripheral if the access information indicates that such use is unauthorized.

The signal applied by the interruption means to the I/O channel to impede use of a restricted peripheral may be as simple as a halt signal of the type commonly generated by computer peripherals to instruct a central processing unit (CPU) to pause in its operations. Alternatively, the signal or signals may be selected not only to take control of a system CPU but also to include instructions derived from a software routine invoked by the device which cause the computer system to display user warning messages or which implement other more sophisticated security measures.

For the purposes of the disclosure and the appended claims, the term "input/output channel" should be understood as any data transfer mechanism by which a CPU of a computer system communicates with various peripherals. This data transfer mechanism may take the form of a data bus whose lines are dedicated exclusively to peripheral I/O operations, or in certain computer architectures, such as that described below in connection with preferred embodiments of the invention, may involve a single general purpose data bus serving both internal memory and peripherals, but which during I/O operations has certain lines dedicated to conduction of address signals, transfer of control signals (including address validation signals) between the CPU and various peripherals, and transfer of data. The term "address signal" should be understood as any signal uniquely identifying a particular peripheral, and an "address validation signal" should be understood as a signal whose function at least in part is to confirm that a valid address signal has been generated.

Other aspects and advantages of the present invention will be described below in connection with a description of certain preferred embodiments.

DESCRIPTION OF THE DRAWINGS

The invention will be better understood with reference to drawings in which:

FIG. 1 diagrammatically illustrates the overall configuration of a computer system incorporating an access control module constructed according to the invention;

FIG. 2 schematically illustrates a first embodiment of an access control module which essentially halts the operation of a computer system in response to a security violation;

DESCRIPTION OF PREFERRED EMBODIMENTS

Figure 3:
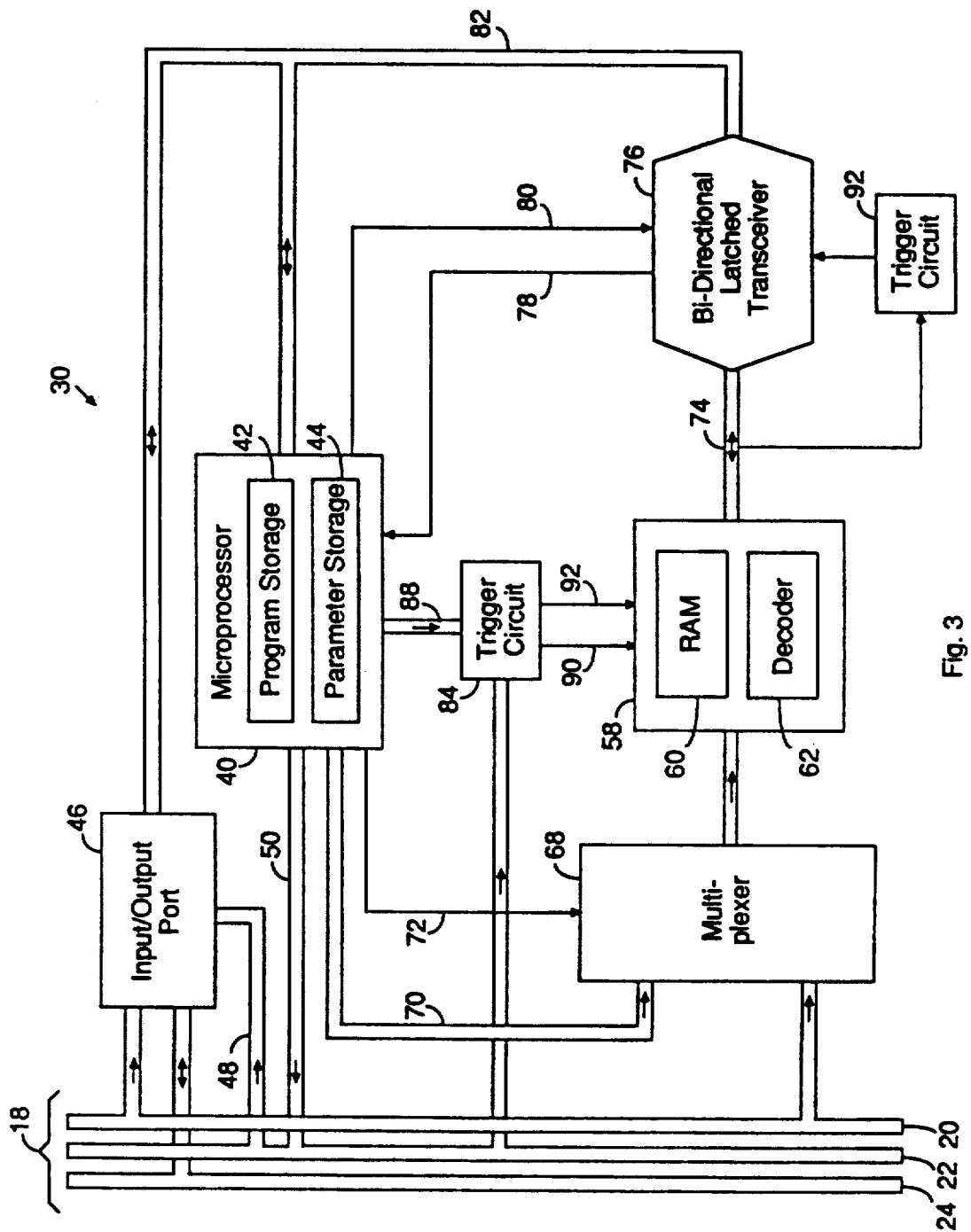
FIG. 3 illustrates a second embodiment of an access control module permitting implementation of a user authorization routine, re-programming of system access restrictions and other functions; and, FIG. 4 diagrammatically illustrates the form in which access information is stored in the access control module of FIG. 3.

Reference is made to FIG. 1 which illustrates a computer system comprising a CPU 10, internal memory 12, and two peripherals, a printer 14 and a disk drive 16. The CPU 10 communicates with the two peripherals via an I/O channel 18 having address lines 20 which conduct peripheral address signals, control lines 22 which conduct inter alia address validation signals, and a data bus 24 which serves to transfer data between the CPU 10 and the peripherals during read and write operations. The I/O channel 18 is constituted by a general purpose data bus whose various lines 20, 22, 24 are also used to address memory locations in the internal memory 12 when the data bus is not being used in connection with peripheral I/O operations. The computer architecture illustrated is well known and common to a variety of computers, including a number of personal computers, and consequently the interaction between the CPU 10 and the peripherals in such a computer system will be described below only to the extent necessary to understand the present invention.

A user's request at a keyboard or other input means causes the CPU 10 to generate an address signal, propagated along the address lines 20, which uniquely identifies the selected peripheral. The CPU contemporaneously generates an address validation signal which indicates to each peripheral attached to the I/O channel 18 that a valid address signal directed to a peripheral has in fact been generated. A validation signal is required in this particular computer architecture as the state of each of the address lines 20, typically a logic high or low value representing one bit of information, changes in an unpredictable fashion before final states indicating a request for a particular peripheral are achieved. The various intermediates states of the address lines 20 might be misconstrued as requests for access to other peripherals. Also, signals generated on the various lines 20, 22, 24 may at some times be directed to memory locations in the internal memory 12. The address validation signal is typically a read or write pulse applied by the CPU 10 to the control lines 22 together with an address signal on the address lines 20. Since the peripherals are connected in parallel to the address and control lines, each peripheral receives and effectively considers each valid address signal generated, but only the peripheral uniquely identified by the address signal responds for purposes of read and write operations.

An access control module (ACM) 26 is attached to the I/O channel 18 in much the same manner as are the peripherals 14, 16. In the computer architecture illustrated, each peripheral might typically have an interfacing board commonly referred to as a "card" which is mounted in a receptacle commonly referred to as a "slot". A computer of the architecture illustrated might typically have in its interior a number of such slots so that various peripherals can be conveniently added to the system. For such systems, the ACM 26 is preferably formed on a card which can be inserted directly into a vacant slot, permitting very convenient connection to the system I/O channel.

The attachment of the ACM 26 to the I/O channel 18 permits interaction with the CPU 10 and detection of address signals generated by the system. To that end, the ACM 26 is coupled to the address lines 20 for receipt of address signals and to the control lines 2 for receipt of address validation signals. The ACM 26 is optionally connected to the data bus 24 for transfer of information between the ACM 26 and the CPU 10 or other devices which might potentially be attached to the I/O channel 18 for communication with the ACM 26. Unlike conventional peripherals attached to the I/O channel 18, the ACM 26 responds to and acts on each valid address signal generated by the CPU. In response to each address signal, the ACM 26 generates access information regarding the peripheral identified by the address signal, determines whether access to the peripheral should be impeded, and accordingly applies a signal or signals to the control lines 22 and optionally to the data bus 24 which interfere with normal operation of the CPU and the user's operation of the selected peripheral.

A first comparatively simple embodiment of the ACM is illustrated in FIG. 2 and indicated by the reference numeral 28. A second embodiment 30 which permits programming of user access restrictions and implementation of a relatively more complex response to security violations is illustrated in FIG. 3. It should be noted that in FIGS. 2 and 3 the only component of the computer system which has been illustrated is the I/O channel 18. The general relationship between the two embodiments 28, 30 and the computer system can be understood from the general description of operation above and with reference to FIG. 1.

The ACM 28 includes address responsive means 32 which effectively monitor the address lines 20 for generation of an address signal. The address responsive means 32 determine whether access to the peripheral identified by an address signal is restricted, and generate an output signal indicating whether operation of the peripheral should be impeded. The address responsive means 32 may be constructed as a conventional random access memory (RAM) unit with an associated address decoder. The decoder would essentially locate in the RAM unit those memory locations or units where access information associated with a peripheral identified by a particular address signal is located. One bit among these memory units might be regarded as a "restriction bit". The polarity of the restriction bit would constitute a signal indicating whether access to the peripheral is restricted or authorized.

A conventional key and lock mechanism 34 serves as an actuator for initiating operation of the address responsive means 32. The address responsive means 32 are otherwise conditioned to produce an output signal indicating restricted access for all address signals generated on the address line, preventing any access to system peripherals. If desired, the required access information can be loaded into the above-mentioned RAM unit from programmable or permanent storage units located in the actuator 34.

The ACM 28 includes latching circuitry 36 which responds to the access information contained in the output signal of the address responsive means 32. The operation of the latch 36 is controlled by trigger circuitry 38, which may be constituted by conventional logic gates responsive to address validation signals in the control lines 22. Upon generation of an address validation signal, such as a read or write pulse, the trigger circuitry 38 triggers the latch 36 to produce an output signal. If the access information received at that time by the latch 36 from the address responsive means 32 indicates that access to the selected peripheral is restricted, the latch 36 applies a halt signal to the control lines 22 thereby causing the CPU 10 to cease further operation. The halt signal is in effect "latched", as the latch 36 maintains any output signal until it is once again triggered. The latch 36 may take the form of a clocked flip-flop which effectively passes the restriction bit when a trigger or clock signal is applied to its clock terminal by the trigger circuitry 38.

The halt signal applied by the latch 36 is preferably the same signal which is applied by any peripheral requiring the CPU 10 to cease operation until information received from or to be delivered to the CPU 10 can be processed. The halt signal may alternatively be any signal which disrupts operation of the CPU 10. Since the CPU 10 is no longer responsive, another address signal and address validation signal cannot be generated to alter the operating state of the ACM 28. Accordingly, the computer system remains in a locked state, unresponsive to further user requests, and can only be returned to an operative state by shutting off power and restarting the system or alternatively by resetting the system if provision has been made for such a function.

The second ACM 30 includes a microprocessor 40 having associated program storage 42 and non-volatile parameter storage 44. The program storage 42 contains software routines permitting the implementation of a variety of functions such as log-on procedures for authentication of system users, updating of system access restrictions, and a more complex response to various levels of security violation than possible with the ACM 28, including generation of user warning messages and generation and storage of audit trail data (recording of peripheral accessing and security violations). The implementation of software to perform such functions will be readily apparent to those skilled in the art. The non-volatile parameter storage 44 serves primarily as a main storage means containing access information regarding all authorized system users and peripherals.

The microprocessor 40 is coupled to the I/O channel 18 in a manner which permits the ACM 28 to be addressed in response to a predetermined address signal for read and write operations and which permits general interaction with the CPU 10. To that end, the microprocessor 40 is connected by a conventional input/output port 46 to the address lines 20 and to the data bus 24. Connection of the input/output port 46 to the address lines 20 permits the ACM 30 to be addressed, for example, for receipt of data such as new access information. The input/out port 46 is also coupled by a local data bus 48 to the control lines 22 for receipt of address validation signals (which would indicate not only that the microprocessor has been validly addressed for I/O operations but whether the microprocessor 40 is required to perform read or write functions). Signal lines 50 permit the microprocessor 40 to apply control signals to the I/O channel requesting the attention of the CPU 10, including signals such as a halt signal capable of interrupting CPU operation. This arrangement facilitates the implementation of the various functions described above.

Figure 4:
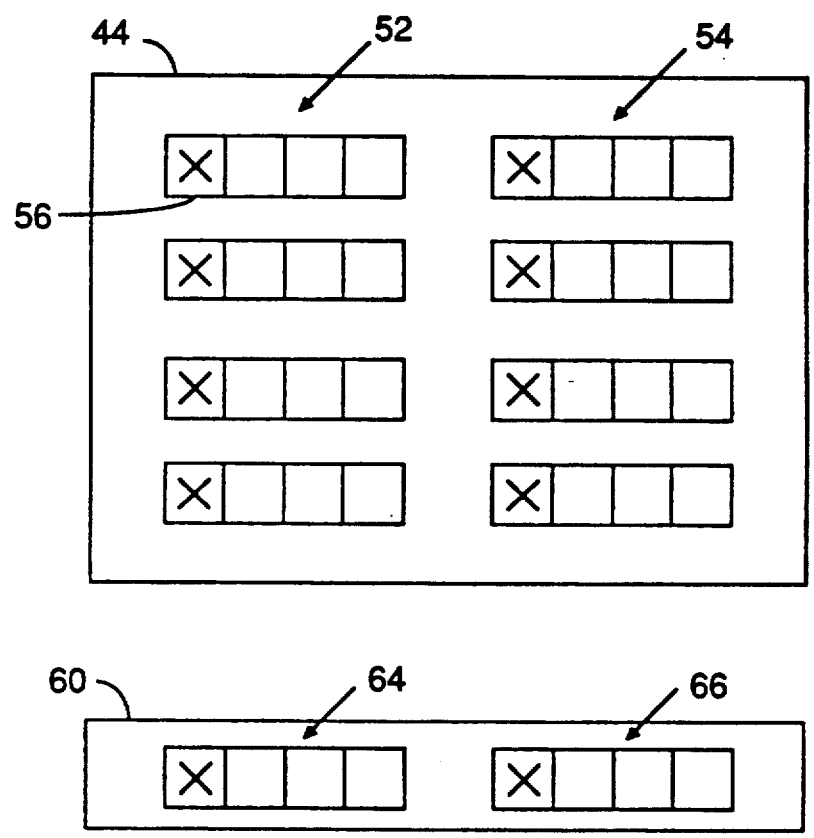

The access information in the parameter storage 44 is arranged in sets, each set consisting of the access information for a particular user of the computer system on a peripheral-by-peripheral basis. This will be more apparent with reference to FIG. 4 where the memory locations or units associated with the storage unit have been symbolically represented. One set of access information relating to a first user of the computer system may be stored in memory locations 52, 54. The memory location 52 may contain access information for the printer 14, while the memory location 54 may contain access information for the disk drive 16. The stored access information regarding the printer is typical, comprising a restriction bit 56 and a number of information bits which might identify the exact nature of the peripheral. The parameter storage unit 44 is shown as defining sets of access information for a total of four users in respect of two peripherals. It will be appreciated that FIG. 4 is not a true depiction of the parameter storage unit 44, and that in practice such a storage unit would likely have sufficient resources to store access information for a much larger number of users and peripherals.

Access information can be loaded into the storage unit 44 by addressing the ACM 30 as a conventional peripheral. Data can then be loaded into the storage unit 44 from the data bus 24 in a standard write operation controlled in part by a software routine located in program storage 42. The software routine adapts the microprocessor 40 to receive from the input/output channel a user identification code, a number of address signals identifying particular peripherals and access information associated with each of the peripherals. The microprocessor 40 responds to each address signal by locating unique memory locations in the parameter storage 44 and storing at those memory locations the access information associated with the particular peripherals as appropriate for the user identified by the code. For example, in response to a user identification code for the first user mentioned above, and address signals for the printer 14 and disk drive 16, the microprocessor would locate the memory locations or units 52, 54, and would load access information received on the data bus 24 into those unique memory locations. The most convenient construction of the parameter storage 44 would involve a conventional address decoder capable of locating unique memory in response to the combination of a user identification code and each peripheral's address signal. Such a decoder would thereafter permit a mode of operation in which the stored information can be retrieved from the main storage unit by once again applying the combination of a user identification code and a peripheral address signal to the decoder. In an analogous fashion, current access restrictions can be reviewed or audit trail information can be retrieved from storage locations in the storage unit 44 for review by a security officer, in a standard read operation.

The ACM 30 includes an addressed storage device 58. The storage device 58 comprises a RAM unit 60 and associated address decoder 62, these being of conventional design and commonly available as a single package. The RAM unit 60 serves as a secondary storage unit containing at any given time one set of access information retrieved from the parameter storage 44 and corresponding to a particular user. This arrangement is symbolically illustrated in FIG. 4 where two memory locations in the RAM unit 60 have been shown. One memory location 64 might contain access information for the printer 14, the other memory location 66, access information for the disk drive 16, both related to one of the authorized system users. In response to an address signal, the decoder 62 locates and causes to be output from the RAM unit 60 (when the address storage unit 58 is appropriately triggered) the access information for the peripheral identified. It should be noted that the representation of the RAM unit 60 in FIG. 4 is symbolic only, and that in practice the addressed storage unit 58 would define sufficient storage locations to accommodate any number of peripherals which might practically be connected to the I/O channel 18.

A controllable multiplexer 68 permits the storage device 58, specifically the address decoder 62, to be selectively coupled either to the address lines 20 for receipt of address signals generated in response to user requests for transfer of data, commands and status information to and from peripherals or alternatively to the microprocessor 40, along a local address line 70. The latter arrangement permits receipt of address signals from the microprocessor during loading of access information relevant to a particular user into the RAM unit 60. The microprocessor 40 applies control signals along a control line 72 to the multiplexer 68, effectively selecting the data path from which address signals are to be delivered to the address decoder 62.

After start-up of the computer system and identification of a particular user in a log-on routine described more fully below, the addressed storage unit 58 effectively monitors the address lines 20. In response to an address signal detected on the address lines 20, the address decoder 62 effectively locates the memory units or locations in the RAM unit 60 containing the access information relating to the peripheral identified by the address signal, and causes the RAM unit 60 to produce an output signal corresponding to the located memory bits (when the address storage unit 58 is otherwise triggered for output). For example, the access information in the memory locations 64, 66 of the RAM unit 60 may correspond respectively to the first user's authority to access the printer 14 and disk drive 16. If an address signal identifying the printer 14 is generated in the I/O channel 18, the bits of access information in the memory location 64 may be located by the address decoder 62 and made available by the RAM unit 60. These bits include the restriction bit which indicates whether access to the particular peripheral is restricted to the first user and identity bits which identify the selected peripheral as the printer 14.

The output signal of the addressed storage unit 58 is transmitted along a local bi-directional data path 74 to a conventional bi-directional latched transceiver 76. When appropriately triggered, the transceiver 76 produces an output signal corresponding to the bits of information produced by the RAM unit 60 including the restriction bit for the identified peripheral. Depending on the state of the restriction bit, the transceiver 76 applies a signal the microprocessor 40 along a control line 78 instructing the microprocessor 40 to examine the bits of the transceiver output signal, which are available to the microprocessor 40 on a local data bus 82. If the restriction bit indicates that access to the peripheral, such as the printer 14, should not be allowed, the microprocessor 40 considers the restriction and information bits, applies a halt signal to the control lines 22, and then proceeds to invoke a software routine stored in the program storage 42 causing the CPU 10 to display a user warning. The microprocessor 40 may simultaneously invoke an audit trail routine also contained in the program storage 42 which records the security violation in the non-volatile parameter storage 44 for later review by a security officer.

During start-up of the computer system, the microprocessor 40 interrupts normally operating system procedures and invokes a log-on routine stored in the program storage unit 42 to obtain a user identification code. This log-on routine has a dual function: first, it ensures that only preselected authorized users of the computer system are allowed access to any of the resources associated with the computer system; and second, once a user identification code has been entered, the microprocessor 40 can retrieve from the main non-volatile parameter storage 44 the set of access information corresponding to the user identified by the code and load the set of information into the secondary storage unit, the RAM unit 60.

During this start-up process, the microprocessor 40 applies a control signal to the control line 72 requiring the multiplexer 68 to place the address decoder 62 of the secondary storage unit into communication with the microprocessor 40 for receipt of address signals. In response to the user identification code, the microprocessor 40 sequentially retrieves from the non-volatile parameter storage 44 the set of access information associated with the identified user, such as the access information in memory location 52, 54 assuming that the first user has been identified. The microprocessor 40 generates in succession the address signals associated with each of the peripherals of the computer system such as the printer 14 and disk drive 16, and contemporaneously delivers in succession to the RAM unit 60 via the local data bus 66, the transceiver 76 and the data bus 74, the access information associated with each of the peripherals, as defined for the particular user. The decoder 62 responds to each address signal generated by the microprocessor 40 by locating unique memory units in which the access information received from the microprocessor 40 is stored for later retrieval. Accordingly, assuming that the first user of the system mentioned above has been identified, the access information in memory location 52 of the non-volatile parameter storage 44 relating to the printer might be loaded into memory location 654 of the RAM unit 60, and the access information in memory location 54 of the non-volatile parameter storage 44 relating to the disk drive 16 might next be loaded into memory location 66 of the RAM unit 60. It should be noted that the operation of the transceiver 76, either to transmit access information generated by RAM unit 60 to the microprocessor 40 or to transmit access information from the main storage unit of the microprocessor 40 to the RAM unit 60 during system start-up, is controlled by the microprocessor 40 by signals applied along a control line 80.

The practice of loading one set of access information in response to a user identification code from the main storage means defined by the non-volatile parameter storage unit 44 to the secondary storage unit defined by the address storage device 58 reduces the amount of active electronic memory required to store access information for purposes of normal operation. More significantly, it greatly simplifies the address decoding function as the user identification code (which would otherwise have to be stored and operated upon) need no longer be considered in determining whether access to a particular peripheral is authorized. This arrangement reduces considerably the complexity of operations following start-up, and, most significantly, generates required access information at a sufficient speed that the ACM can in fact respond in a timely fashion to address signals generated in conventional microcomputers. It should be noted that the latching of the transceiver output signal also contributes to proper response to address signals by maintaining the access information generated until the microprocessor 40 is able to consider the information and respond accordingly.

It should be noted that the ACM 30 has trigger circuitry which effectively times of enables various operations associated with the device.

The ACM 30 has trigger logic circuitry 84 which controls the generation of access information by the addressed storage unit 58 and the loading of access information into the addressed storage unit 58. During monitoring of the address lines 20 for user selection of peripherals, the trigger circuitry 84 responds to address validation signals (such as read and write pulses) generated on the control lines 22. Upon detection of an address validation signal, the trigger circuitry 84 applies a read enable signal to the addressed storage unit 58 along a control line 86, which enables the generation of an output signal from the RAM unit 60. Accordingly, access information is provided by the RAM unit 60 only upon generation of a valid address signal identifying a particular peripheral. During log-on, the trigger circuitry 84 responds to signals applied by the microprocessor 40 along a local control bus 88, and applies a write enable signal to a signal line 90 which conditions the RAM unit 60 for receipt and storage of access information transmitted by the microprocessor 40 to the RAM unit 60 ultimately along the bi-directional data path 74.

Additional trigger circuitry 92 controls or triggers the response of the transceiver 76 to the output signals generated by the address storage unit 58. The trigger circuitry 92 responds to the output signal of the RAM unit 60, specifically the polarity of the retrieved restriction bit. It triggers the transceiver 76 thereby enabling the transceiver 76 to generate its output signals.

It will be apparent that the ACM's described lend themselves to use with personal computers. When formed as cards adapted for insertion into conventional slots, they can be conveniently installed into existing computers to retrofit such machines for access control without noticeably interfering with normal authorized operation. Alternative methods of connecting such ACM's to I/O channel to accommodate alternative computer architectures will be readily apparent to those skilled in the art. It will also be apparent that the ACM's described herein are essentially hardware devices. Accordingly, they are inherently capable of providing more reliable security control than either operating system software or specific application software.

Particular embodiments of the invention have been described and these should not be construed as limiting the scope of the invention or the scope of the appended claims. In particular, storage and retrieval of access information using appropriate memory units represents only one form of access information generating means. It will be apparent to those skilled in the art that combinatorial or boolean logic may be used to translate each address signal generated in an I/O channel (together with any user identification code if security requires user authentication) into a signal indicating whether access to a particular peripheral should be impeded. Such logic can be implemented as hard-wired logic gates or as a software algorithm stored in appropriate non-volatile memory provided in the ACM. Appropriate wiring or interfacing means may couple the logic circuitry or software device to the I/O channel for actuation in response to address signals generated by the computer system. Use of logic gates would, however, have limited application, as an ACM employing such gates cannot be readily reconfigured to permit access information to be changed. The parameters of a software routine, on the other hand, can be easily changed by conventional techniques to permit modifications of access restrictions. A software implementation of the required function may not permit ACM operating speeds appropriate for timely response to the address signals generated in most computer systems, unless the ACM has a microprocessor which operates markedly faster than that of the monitored computer system itself. Storage and retrieval of access information in appropriate memory units has been emphasized in this specification as these are viewed as a singularly advantageous means for generating access information for purposes of the invention, allowing both timely operation and convenient reconfiguration of an ACM.

I claim:

1. A device for preventing unauthorized access to computer peripherals attached to the input/output channel of a computer system in which a processing unit transmits an address signal along the input/output channel to the peripherals whenever a user selects any one of the peripherals for data transfer, said device comprising:

storage means for storing access information regarding a user's authority to access each of the peripherals;

address-responsive means for detecting the address signal transmitted along the input/output channel by the processing unit to the peripherals and for retrieving from the storage means in response to the detected address signal transmitted by the processing unit, the access information associated with the selected peripheral; and, interruption means responsive to the retrieved access information for automatically applying a signal to the input/output channel which prevents use of the selected peripheral whenever the retrieved access information indicates that access to the selected peripheral is restricted.

2. A device as claimed in claim 1 in which the storage means comprise:

main storage means having a multiplicity of storage units for storing sets of access information for preselected users of the computer system, each set comprising information regarding the preselected users authority to access each peripheral; and, secondary storage means having a multiplicity of storage units for storing the access information associated with one of the sets.

3. A device for preventing unauthorized access to computer peripherals attached to the input/output channel of a computer system in which a processing unit transmits an address signal along the input/output channel to the peripherals whenever a user selects any one of the peripherals for data transfer, comprising:

storage means for storing access information regarding a user's authority to access each of the peripherals, said storage means comprising:

main storage means having a multiplicity of storage units for storing sets of access information for preselected users of the computer system, each set comprising information regarding the preselected users authority to access each peripheral; and, secondary storage means having a multiplicity of storage units for storing the access information associated with one of the sets;

address-responsive means for detecting the address signal transmitted along the input/output channel to the peripherals and for retrieving from the storage means in response to the detected address signal the access information associated with the selected peripheral;

interruption means responsive to the retrieved access information for automatically applying a signal to the input/output channel which prevents use of the selected peripheral whenever the retrieved access information indicates that access to the selected peripheral is restricted;

log-on means for applying signals to the input/output channel during start-up of the computer system which require entry into the computer system of a user identification code identifying one of the preselected users; and, processor means responsive to entry of the user identification code for loading into the storage units of the secondary storage means the set of access information of the main storage means associated with the user identified by the identification code.

4. A device as claimed in claim 3 in which the address-responsive means comprise decoder means responsive to the address signal for locating the storage units in the secondary storage means where the access information associated with the selected peripheral is stored.

5. A device as claimed in claim 4 comprising:
controllable switching means for selectively coupling the address-responsive means to one of the processor means and the input/out channel for receipt of address signals;
the processor means being adapted during start-up of the computer system to
A. actuate the switching means so that the decoder means respond to address signals generated by the processor means,
B. apply to the decoder means successively address signals associated with the peripherals, and
C. transfer the set of access information associated with the preselected user identified by the user identification code on a peripheral-by-peripheral basis to those storage units of the secondary storage means located by the decoder means.

6. A device as claimed in claim 3 comprising data transfer means for coupling the processor means to the input/output channel, the data transfer means being adapted to make the processor means responsive to a predetermined address signal generated on the input/output channel for transfer of information between the processor means and the input/output channel.

7. A device as claimed in claim 6 in which:
the processor means are adapted to receive from the input/output channel a user identification code, a preselected number of address signals identifying particular peripherals and access information associated with each of the particular peripherals;
the processor means are adapted to respond to each of the preselected number of address signals and to the user identification code by locating unique storage units in the main storage means and storing at the unique storage units the user access information associated with the user and one of the peripherals; and,
the processor means have a mode of operation in which the processor means are adapted to retrieve the stored access information from the unique storage units in response to the user identification code.

8. A device for preventing unauthorized access to computer peripherals attached to the input/output channel of a computer system in which a processing unit transmits an address signal along the input/output channel to the peripherals whenever a user selects any one of the peripherals for data transfer, comprising:
storage means for storage access information regarding a user's authority to access each of the peripherals;
address-responsive means for detecting the address signal transmitted along the input/output channel to the peripherals and for retrieving from the storage means in response to the detected address signal the access information associated with the selected peripheral; and,
interruption means responsive to the retrieved access information for automatically applying a signal to the input/output channel which prevents use of the selected peripheral whenever the retrieved access information indicates that access to the selected peripheral is restricted, said device for use with a computer system in which an address validation signal is transmitted by the processing unit along the input/output channel to the peripherals together with the address signal, the address-responsive means comprising:
decoder means for receiving the address signal from the input/output channel and locating in the storage means the access information associated with the selected peripheral, the decoder means being adapted to cause the storage means to generate an output signal corresponding to the access information;
triggerable latching means for producing from the storage means output signal a latched output signal indicating whether the access to the selected peripheral is restricted; and,
trigger means for triggering the latching means to produce the latched output signal in response to the address validation signal conducted by the input/output channel.

9. A device for preventing unauthorized access to computer peripherals connected to the input/output channel of a computer system in which a processing unit transmits an address signal along the input/output channel to the peripherals whenever a user selects any one of the peripherals for data transfer comprising:
access information generating means which can be actuated to generate information regarding a user's authority to access each peripheral;
address-responsive means for detecting the address signal in the input/output channel and actuating the access information generating means in response to the detected address signal to generate the access information for the selected peripheral; and,
interruption means responsive to the generated, access information for automatically applying a signal to the input/output channel which prevents use of the selected peripheral whenever the generated access information indicates that access to the selected peripheral is restricted,
wherein an address validation signal is transmitted by the processing unit along the input/output channel to the peripherals together with the address signal, in which:
the access information generating means comprise storage means having a multiplicity of memory units for storing the access information associated with the peripherals;

the address-responsive means comprise decoder means for receiving the address signal and locating the memory units in the storage means where the access information for the selected peripheral is located, the decoder means being adapted to cause the storage means to generate an output signal corresponding to the access information;

latching means for producing from the storage means output signal, when triggered, a latched output signal indicating whether access to the selected peripheral is restricted; and, trigger means for triggering the latching means to produce the latched output signal in response to the address validation signal.

* * * * *